(12) United States Patent
Patil et al.

(10) Patent No.: US 12,294,629 B2
(45) Date of Patent: *May 6, 2025

(54) DYNAMIC AND OPTIMAL SELECTION OF INTERNET OF THINGS (IoT) HUBS IN CELLULAR NETWORKS

(71) Applicant: AT&T Mobility II LLC, Atlanta, GA (US)

(72) Inventors: Basavaraj Patil, Dallas, TX (US); Senthil Nathan Ramakrishnan, Atlanta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/297,911

(22) Filed: Apr. 10, 2023

(65) Prior Publication Data

US 2023/0247098 A1 Aug. 3, 2023

Related U.S. Application Data

(63) Continuation of application No. 16/855,335, filed on Apr. 22, 2020, now Pat. No. 11,652,891.

(51) Int. Cl.
*H04L 67/142* (2022.01)
*G16Y 30/00* (2020.01)
(Continued)

(52) U.S. Cl.
CPC ............ *H04L 67/142* (2013.01); *G16Y 30/00* (2020.01); *H04L 12/66* (2013.01);
(Continued)

(58) Field of Classification Search
CPC ... H04L 67/142; H04L 12/66; H04L 61/4511; H04L 67/125; H04L 67/52; G16Y 30/00;
(Continued)

(56) References Cited

U.S. PATENT DOCUMENTS 9,497,572 B2 * 11/2016 Britt .................... H04W 4/80
9,860,681 B2    1/2018 Britt et al.
(Continued)

FOREIGN PATENT DOCUMENTS

WO   2018005216 A1   1/2018
WO   2018167245 A1   9/2018
WO   2019157955 A1   8/2019

OTHER PUBLICATIONS

Georgakopoulos et al., "Discovery-Driven Service Oriented IoT Architecture," 2015 IEEE Conference on Collaboration and Internet Computing (CIC), Oct. 2015, 9 pages.
(Continued)

*Primary Examiner* — Abdullahi E Salad
(74) *Attorney, Agent, or Firm* — Guntin & Gust, PLC; Dana LeMoine

(57) ABSTRACT

An architecture for dynamically selecting and routing traffic from Internet of things (IoT) devices and sensors to the nearest or most proximate IoT hub device. A method can comprise receiving a connection request from a user device; retrieving address data representing a network device of a group of network devices; and sending the address data to the user device.

20 Claims, 10 Drawing Sheets

(51) Int. Cl.
*H04L 12/66* (2006.01)
*H04L 61/4511* (2022.01)
*H04W 4/50* (2018.01)
*H04W 76/10* (2018.01)

(52) U.S. Cl.
CPC ........... *H04L 61/4511* (2022.05); *H04W 4/50* (2018.02); *H04W 76/10* (2018.02)

(58) Field of Classification Search
CPC ....... H04W 4/50; H04W 76/10; H04W 40/20; H04W 40/22; Y02D 30/70
See application file for complete search history.

(56) References Cited

U.S. PATENT DOCUMENTS

| | | | |
|---|---|---|---|
| 9,894,473 | B2 | 2/2018 | Britt et al. |
| 9,954,956 | B2 | 4/2018 | Adrangi et al. |
| 9,974,015 | B2 | 5/2018 | Zakaria et al. |
| 9,977,415 | B2 * | 5/2018 | Zimmerman ....... H04L 12/2807 |
| 10,212,030 | B2 | 2/2019 | Chakrabarti et al. |
| 10,230,798 | B2 | 3/2019 | Doraiswamy et al. |
| 10,291,477 | B1 * | 5/2019 | Askar ..................... H04W 4/50 |
| 10,291,595 | B2 | 5/2019 | Britt et al. |
| 10,405,150 | B2 | 9/2019 | Aiuto et al. |
| 10,425,242 | B2 | 9/2019 | Berdy et al. |
| 10,455,452 | B2 * | 10/2019 | Britt ....................... H04W 28/10 |
| 2006/0003765 | A1 * | 1/2006 | Patil ........................ H04W 8/12 455/411 |
| 2006/0268752 | A1 * | 11/2006 | Ackermann-Markes .................... H04L 67/14 370/260 |
| 2011/0021196 | A1 * | 1/2011 | Grayson ............. H04W 12/086 455/435.2 |
| 2015/0358777 | A1 | 12/2015 | Gupta |
| 2016/0128043 | A1 | 5/2016 | Shuman et al. |
| 2016/0323156 | A1 | 11/2016 | Zakaria |
| 2017/0142060 | A1 * | 5/2017 | Thakar ................ H04L 61/4511 |
| 2017/0289806 | A1 * | 10/2017 | Girdhar ................. H04W 12/64 |
| 2017/0346836 | A1 | 11/2017 | Holland et al. |
| 2017/0358948 | A1 * | 12/2017 | Maxson ................. G06Q 10/20 |
| 2018/0020329 | A1 * | 1/2018 | Smith ..................... H04W 4/08 |
| 2018/0109308 | A1 | 4/2018 | Leroux |
| 2018/0246484 | A1 | 8/2018 | Zimmerman et al. |
| 2018/0324105 | A1 * | 11/2018 | Gillon ..................... H04L 47/74 |
| 2019/0021067 | A1 * | 1/2019 | Huang .................... H04W 8/02 |
| 2019/0028338 | A1 * | 1/2019 | Kozura ............... H04W 12/069 |
| 2019/0045412 | A1 * | 2/2019 | Shivam ................. H04W 40/02 |
| 2019/0089603 | A1 | 3/2019 | Harat et al. |
| 2019/0109816 | A1 * | 4/2019 | Liu ......................... H04L 63/02 |
| 2019/0121497 | A1 | 4/2019 | Tov et al. |
| 2019/0191295 | A1 | 6/2019 | Jain et al. |
| 2019/0200438 | A1 * | 6/2019 | Alexander ............. H05B 45/30 |
| 2019/0306090 | A1 * | 10/2019 | Shang .................... H04W 4/12 |
| 2019/0387028 | A1 * | 12/2019 | Aon ...................... H04L 63/102 |
| 2019/0392418 | A1 * | 12/2019 | Butler .................... G06Q 20/36 |
| 2020/0053693 | A1 * | 2/2020 | Lopes ................. H04W 64/006 |
| 2020/0067726 | A1 * | 2/2020 | Berdy ................. H04L 12/2809 |
| 2020/0304445 | A1 * | 9/2020 | Dinhthi ................. G06F 3/0481 |
| 2021/0118079 | A1 * | 4/2021 | Li ......................... G06Q 10/047 |
| 2021/0258374 | A1 * | 8/2021 | Wang ..................... H04W 88/16 |

OTHER PUBLICATIONS

Liu et al, "A small world based routing approach of heterogeneous strategy in the Internet of Things," 2011 International Conference on Computer Science and Network Technology, 5 pages.

Pethaperumal et al., "Budget-Hub: A Low Cost IoT Hub Selection and Neighbor Assignment Scheme," 2018 IEEE 4th World Forum on Internet of Things (WF-IoT), Feb. 5-8, 2018, 6 pages.

Non-Final Office Action received for U.S. Appl. No. 16/855,335 dated Feb. 19, 2021, 31 pages.

Final Office Action received for U.S. Appl. No. 16/855,335 dated Aug. 17, 2021, 22 pages.

Non-Final Office Action received for U.S. Appl. No. 16/855,335 dated Jan. 20, 2022, 28 pages.

Final Office Action received for U.S. Appl. No. 16/855,335 dated Jul. 21, 2022, 92 pages.

Notice of Allowance received for U.S. Appl. No. 16/855,335 dated Jan. 11, 2023, 36 pages.

* cited by examiner

DYNAMIC AND OPTIMAL SELECTION OF INTERNET OF THINGS (IoT) HUBS IN CELLULAR NETWORKS

RELATED APPLICATION

The subject patent application is a continuation of, and claims priority to, U.S. patent application Ser. No. 16/855,335, filed Apr. 22, 2020, and entitled "DYNAMIC AND OPTIMAL SELECTION OF INTERNET OF THINGS (IoT) HUBS IN CELLULAR NETWORKS," the entirety of which priority application is hereby incorporated by reference herein.

TECHNICAL FIELD

The disclosed subject matter provides systems and methods for dynamically selecting and routing traffic from Internet of things (IoT) devices and sensors to the nearest or most proximate IoT hub device.

BACKGROUND

Cloud computing services, such as Windows Azure, can be used for building, testing, deploying and/or managing services and/or applications operational in one or more geographically remote data centers (e.g., groupings of cloud computing data centers that can be distributed in many diverse geographical locations throughout the world).

Generally, cloud computing services can include instantiations of virtual machines allowing users to launch general-purpose virtual machines executing disparate operating systems, e.g., various versions and/or distributions of Linux, and/or applications; iterations of diverse application service environments allowing for the publication and/or management of disparate websites; high density hosting of diverse websites; collection of real-time analytic data that can highlight user behavior, and/or based on the real-time analytics data, the dispatch of notifications to user equipment devices; storage services, data management services, messaging services, media services, content delivery service (e.g., streaming of audio, video, applications, images, static files, etc., and the like).

DETAILED DESCRIPTION

Figure 1:
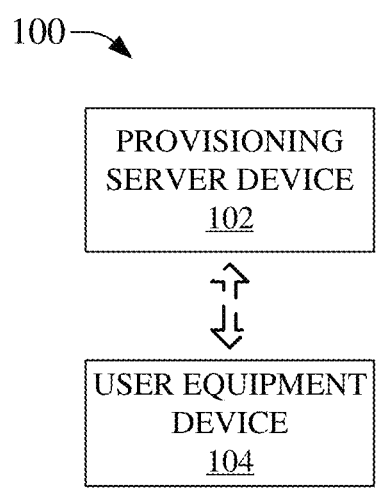
FIG. 1 is an illustration of a system for dynamically selecting and routing traffic from Internet of things (IoT) devices and sensors to the nearest or most proximate IoT hub device, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed systems and methods, in accordance with various embodiments, provide a system, apparatus, or device comprising: a processor, and a memory that stores executable instructions that, when executed by the processor, facilitate performance of operations. The operations can comprise in response to receiving a connection request from a user device, facilitating retrieval of first address data representing a network device of a group of network devices; based on the first address data, facilitating retrieval of second address data representing a hub device of a collection of hub data devices; and sending the first address data or the second address data to the user device In accordance with further embodiments, the subject disclosure describes a method and/or process, comprising a series of acts that, for example, can include: receiving a connection request from a user device; retrieving address data representing a network device of a group of network devices; and sending the address data to the user device.

In accordance with still further embodiments, the subject disclosure describes a machine readable storage medium, a computer readable storage device, or non-transitory machine readable media comprising instructions that, in response to execution, cause a computing system comprising at least one processor to perform operations. The operations can include: receiving a connection request from a user device; retrieving, by the device, address data representing a network device of a group of network devices; and sending, by the device, the address data to the user device.

The disclosed and described systems and methods enables the optimal selection and routing of traffic from IoT devices (e.g. user devices, industrial devices, home monitoring devices (doorbells, thermostats, cameras, and the like) and sensor devices (e.g., sensor devices associated with other devices, such a consumer devices like refrigerators, television sets, automobiles, aviation vehicles, etc.) to the nearest IoT hub device. The IoT hub device can then collect, collate, aggregate, analyze, monitor telemetric data. Telemetric data can include data representing temperature data, humidity data, state data and the like that can be obtained from one or more IoT devices. It will be appreciated by those of ordinary skill, that IoT devices can be located in any location imaginable, such as in residential environments, industrial/commercial environments, vehicles, etc. Selection of the nearest IoT hub can have significant advantages since communication latencies can be reduced. Additionally, telemetric traffic can be routed over the least number of hops which can reduce the overall cost of transmitting packets comprising telemetric data.

A packet gateway (PGW) device in a cellular network (e.g., a mobile network operator (MNO) entity carrier network topology) can terminate user plane traffic from one or more IoT devices. The PGW device, in many instances, can either determine and select optimally beneficial IoT hub devices to be used by the IoT device for purposes of telemetry data collection or the PGW device can assist other collections of networked devices, such as multi-access edge compute (MEC) devices and/or network edge computer (NEC) devices, to determine or identify the optimally beneficial IoT hub devices. With more IoT traffic moving towards edge elements such as MEC and/or NEC devices, it is essential that the nearest or more proximate IoT hub device be determined, identified, and/or used by IoT devices.

Having the IoT hub device closer to the point of attachment also reduces data transmission failures which can occur because of latency factors. The subject disclosure can have specific applicability in the context of low power wide area (LPWA) devices and networks, such a long term evolution machine type communication (LTE-M) devices and/or narrowband internet of things (NB-IoT) devices, and devices affiliated and/or operational with the long term evolution (LTE) and/or the fifth generation (5G) wireless technology for digital cellular networks. It is contemplated that the industry will adopt optimal determination, identification, selection and/or routing to the most proximate or nearest IoT hub devices because of the value from doing so. Additionally, in cases where data from IoT devices are statutorily and/or regulatory required to remain in a specified or defined geographic area (e.g., particular country, economic trading bloc, etc.) an IoT device (e.g., end user device, mobile device, smart phone device, sensor devices associated with vehicles, etc.) that typically roams within the specified or defined geographic area can dynamically be assigned to a IoT hub device of a grouping of compliant IoT hub devices dispersed over and/or within specified or defined geographic area.

Currently IoT hub devices are a primary data ingestion point in cloud computing services architectures/environments, such as Windows Azure. Telemetry data from IoT devices are typically sent to IoT hub devices. IoT devices are generally pre-provisioned and/or associated with address data of an IoT hub device at the time at which the IoT device is initially provisioned. A customer of IoT devices that has a global presence, for example, can instantiate IoT hub devices in multiple geographically diverse cloud computing data centers (e.g., in cloud computing data centers located throughout the world; in different economic trading blocs; on disparate continents; and/or under a multiplicity of diverse regulatory regimes). The IoT device can thus be configured with an end point address of an identifiable or defined IoT hub device. Thus, when configured an IoT device is powered up and needs to send data, it will typically attempt to communicate with the IoT hub device to which it was initially configured to communicate with. Such pre-provisioned pairings of IoT device with IoT hub device(s) does not however take into consideration the mobility of devices (e.g., IoT devices). An IoT device operational in the United States at some point in its lifecycle can be physically relocated to another geographical region, such as Europe, South Asia, South East Asia, Oceania, etc. With the current approach an IoT device, which had originally been configured and homed in the United States, as a result of its original configuration will still continue to communicate with the IoT hub device in the United States, even when the IoT device is relocated to another geographical location. This can result in increased communication latencies as well as inefficient routing, and in some cases it can also violate local data privacy regulations. The problem that the subject disclosure overcomes is the static assignment or pairing of IoT hub devices to IoT devices, wherein the static assignment or pairing generally performed at the time of provisioning by centralized IoT device provisioning server device(s).

To date a solution that has been used to overcome the static assignment or pairing of IoT hub devices to IoT devices has been to manually update the centralized IoT device provisioning server device with a new IoT hub device endpoint to associate with the IoT device, and subsequently push the new configuration to the IoT device. This approach however assumes that a customer or operator of the IoT device knows that an IoT device has been moved elsewhere. Accordingly, this is not a very viable solution because of the large numbers of IoT devices (e.g., thousands to millions of devices). Additionally, the solution requires manual intervention to update the configuration on both at the centralized IoT device provisioning server device, and at the IoT device. Further, given the large numbers of IoT devices, the current solution is not practicably scalable. Moreover, the current static configuration paradigm is brittle and does not deal with the dynamic nature of IoT devices and the reality that IoT devices can be very mobile; transiting between continents, countries, and/or economic trading areas.

With reference to the Figures, FIG. 1 illustrates a system 100 for dynamically selecting and routing traffic from Internet of things (IoT) devices and sensors to the nearest or most proximate IoT hub device, in accordance with aspects of the subject disclosure. As illustrated, system 100 can comprise provisioning server device 102 that can be in operative communication with user equipment device 104. In various embodiments, provisioning server device 102 can comprise a processor coupled to a memory device, and/or storage device. The processor can be coupled to the memory device, wherein the processor can effectuate and/or facilitate execution of computer executable or machine executable instructions that can have been stored to the memory device. Additionally, the memory device, in addition to storing computer executable and/or machine executable instructions can also persist various data that can be used, in conjunction with the computer executable and/or machine executable instructions to facilitate and/or effectuate performance of various disparate operations. Further, as observed above the processor can also be coupled to a storage device that can provide longer term storage for the computer executable or machine executable instructions, the various persisted data, and/or data that can have been generated by the processor as a consequence of facilitating and/or effectuating performance of the operations.

In relation to user equipment device 104 this device too can comprise a processor coupled to a memory device, and/or further coupled to a storage device. The processor can be coupled to the memory device, wherein the processor can effectuate and/or facilitate execution of computer executable and/or machine executable instructions that can have been stored to the memory device. Additionally, the memory device, in addition to storing computer executable and/or machine executable instructions can also persist various data that can be used, in conjunction with the computer executable and/or machine executable instructions to facilitate and/or effectuate performance of various disparate operations. Further, as observed above the processor can also be coupled to a storage device that can provide longer term storage for the computer executable or machine executable instructions, the various persisted data, and/or data that can have been generated by the processor as a consequence of facilitating and/or effectuating performance of the operations.

In regard to provisioning server device 102 and/or user equipment device 104, these respective devices can respectively be any type of mechanism, machine, device, facility, and/or instrumentality, such as virtual reality (VR) devices, wearable devices, heads up display (HUD) devices, machine type communication devices, and/or wireless devices that communicate with radio network nodes in a cellular or mobile communication system. In various embodiments, provisioning server device 102 and/or user equipment device 104 can respectively comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices (and/or sensor devices) associated with, for example, orbiting satellites and/or associated aeronautical vehicles, automotive vehicles, and the like.

In the context set forth in this disclosure, provisioning server device 102 can be a specified device of a grouping of specified devices associated with a mobile network operator (MNO) entity and tasked with configuring and/or provisioning (or pre-provisioning) various devices, such as user equipment device 104, IoT devices, etc. for operation within and/or on wired and/or wireless communication networks controlled and maintained by the MNO entity. In various embodiments, provisioning server device 102 can configure the various devices with addressing data, such internet protocol (IP) addresses to proximate packet gateway (PGW) devices, IoT hub devices, domain name service (DNS) devices, and the like. As will be appreciated by those of ordinary skill in the art, the addressing data and its implementation can in many instances be bespoke based on MNO entity implementation.

In accordance with one or more embodiments, provisioning server device 102 can communicate with user equipment device 104 to provision user equipment device 104, for example, with an appropriate IoT hub device that user equipment device 104 should use to communicate with devices while user equipment device 104 is using the facilities and/or functionalities afforded by the wired and/or wireless communication networks controlled and maintained by the MNO entity.

Figure 2:
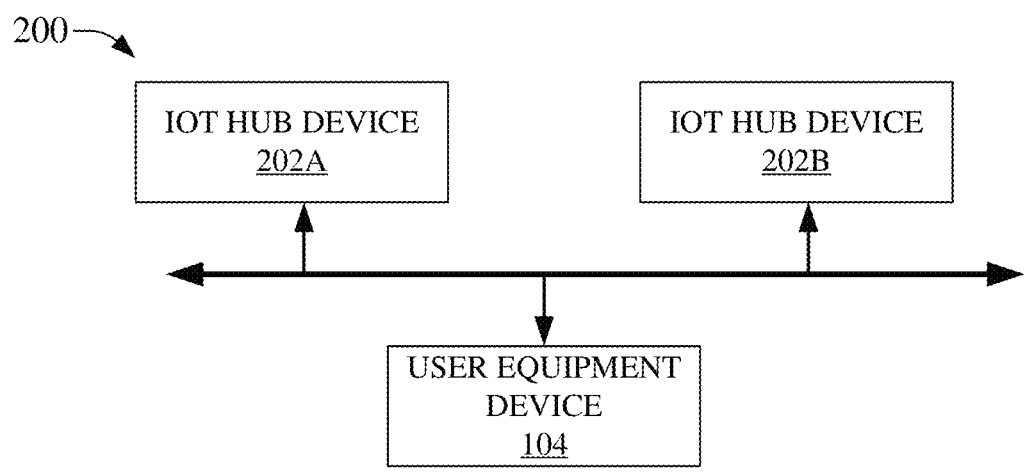
FIG. 2 is a depiction of a further system for dynamically selecting and routing traffic from Internet of things (IoT) devices and sensors to the nearest or most proximate IoT hub device, in accordance with aspects of the subject disclosure.

With reference to FIG. 2, depicted therein is an additional system 200 for dynamically selecting and routing traffic from Internet of things (IoT) devices and sensors to the nearest or most proximate IoT hub device, in accordance with aspects of the subject disclosure. As illustrated system 200 can comprise user equipment device 104 and a first IoT hub device 202A (e.g., "homed" IoT hub device) and a second IoT hub device 202B (e.g., "remote" IoT hub device and/or "foreign" IoT hub device). In accordance with this depiction, the first IoT hub device 202A can be the IoT hub device (e.g., first IoT hub device) that user equipment device 104 has been configured to attach to and/or correspond with while user equipment device 104 is operational within a first wired and/or wireless communication network controlled and maintained by a first MNO entity. The second IoT hub device 202B can be a second IoT hub device that is associated with a geographically remote or geographically distant (e.g., a different continent [e.g., Asia, Africa, Europe, North America, South America, Australia, Oceania, etc.] or disparate economic trading blocs, free trade areas, monetary unions, military alliances, and/or customs unions [e.g., European Union, Southern Common Market, . . . ]) second wired and/or wireless communication network controlled and maintained by a second MNO entity.

In accordance with the depiction presented in FIG. 2 user equipment device 104 can have been configured, on power up, to automatically establish communication, via the first IoT hub device (e.g., IoT hub device 202A) with the first wired and/or wireless communication network controlled and maintained by the first MNO entity. However, at some point user equipment device 104 can have been relocated with the second wired and/or wireless communication network controlled and maintained by a second MNO entity. In the situation currently extant, when user equipment device 104 is powered up in the second wired and/or wireless communication network controlled and maintained by the second MNO entity it currently will automatically attempt to establish communication with the first IoT hub device (e.g., IoT hub device 202A), rather than the second, more proximate, IoT hub device (e.g., IoT hub device 202B), despite the fact that user equipment device 104 is not within the control purview of the first MNO entity, but rather is within the control ambit of the second MNO entity. As noted earlier, this latter situation can result in increased communications latencies, inefficient routing of packets with a packet network, and in some instances can contravene regulatory and/or statutory data privacy legislation.

In order to overcome the foregoing limitations, system 200, in accordance with various embodiments, provides that when user equipment device 104 is powered up it can transmit or broadcast a domain name service (DNS) request for address data associated with a nearby IoT hub device. A packet gateway (PGW) device (not shown) associated with either the first MNO entity and/or the second MNO entity can intercept and/or respond to the DNS request received from user equipment device 104. In various embodiments, the PGW device can be a terminating PGW device that terminates the packet gateway network associated with the either the first wired and/or wireless communication network controlled and/or maintained by a first MNO entity and/or the second wired and/or wireless communication network controlled and/or maintained by a second MNO entity. The intercepting PGW device can respond to the DNS request by returning to user equipment device 104 addressing data representative of an IoT hub device (e.g., IoT hub device 202B) that is more proximate to the current location of user equipment device 104.

In additional and/or alternative embodiments, based on user equipment device 104, having been relocated from a first wired and/or wireless communication network controlled and/or maintained by a first MNO entity to a second wired and/or wireless communication network controlled and/or maintained by a second MNO entity, on power up can connect to IoT hub device 202A (e.g., the homed IoT hub device). The homed IoT hub device 202A can send back addressing data representative of a PGW device to which user equipment device 104 should attempt to contact. The PGW device, in accordance with various embodiments, can either be associated with the first MNO entity and/or second MNO entity, though typically the addressing data will point to a PGW device that will be more proximate to the current location of user equipment device 104 (e.g., the PGW device will generally be associated with the second MNO entity rather than the first MNO entity). User equipment device 104, in response to receiving the addressing data representative of a PGW device can use the addressing data to establish operative communication with the identified PGW device. The PGW device, in response to receiving a request to establish operative communications from user equipment device 104, can provide additional addressing data representative a address information of an IoT hub device (e.g., IoT hub device 202B). As will be comprehended by those of ordinary skill, IoT hub device 202B will generally be a network device of a collection of networked devices under the management and/or control of the second MNO entity. User equipment device 104 can thereafter attach to and communicate with devices in the global wired/wireless communication infrastructure (e.g., the Internet) via IoT hub device 202B controlled and/or managed by the second MNO entity. Once the homed IoT hub device (e.g., IoT hub device 202A) has determined that user equipment device 104 has successful established communications with the PGW device and/or has attached to IoT hub device 202B, IoT hub device 202A can disassociate and detach itself from servicing requests originating from user equipment device 104.

In accordance with yet additional and/or alternative embodiments, when user equipment device 104 is relocated from a first wired and/or wireless communication network controlled and/or maintained by a first MNO entity to a second wired and/or wireless communication network controlled and/or maintained by a second MNO entity, on power up user equipment device 104 can transmit or broadcast a domain name service (DNS) request. A DNS device (not shown) can intercept the DNS request and thereafter perform a first lookup of DNS record data to identify a nearest PGW device through which the DNS request (e.g., from user equipment device 104) emanated. The DNS device, based on the DNS record data identifying the nearest PGW device can then perform a second lookup of the DNS record data to determine an IoT hub device (e.g., IoT hub device 202B) through which user equipment device 104 should attach and communicate. Based on the addressing data that the DNS device can have identified through the first lookup of the DNS record data and the second lookup of the DNS record data, the DNS device can forward to user equipment device 104 address information pertaining to both most proximate the PGW device and the IoT hub device (e.g., IoT hub device 202B) that is in turn the most proximate to the PGW device. In these embodiments, it will be understood that the most proximate PGW device and the IoT hub device most proximate to the identified PGW device, without limitation or loss of generality, will typically be associated with the second MNO entity, rather than the first MNO entity.

In additional and/or alternative embodiments, when user equipment device 104 is relocated from a first wired and/or wireless communication network controlled and/or maintained by a first MNO entity to a second wired and/or wireless communication network controlled and/or maintained by a second MNO entity, on power up user equipment device 104 can broadcast a connection request. The connection request transmitted by user equipment device 104 can be received by IoT hub device 202A (e.g., the IoT hub device with which user equipment device 104 can have initially been paired with by provisioning server device 102). IoT hub device 202A, in response to receiving the connection request from user equipment device 104 and based on determining the user equipment device 104 has been relocated from the management purview associated with the first MNO entity (with which IoT device 202A is affiliated) to the management purview associated with the second MNO entity, can effectuate and/or facilitate execution of a query of a database device of a group of database devices associated with either the first MNO entity and/or the second MNO entity. The query of the database device of the group of database devices can be facilitated using an application programming interface to permits IoT hub device 202A to query devices comprising the group of database devices. In accordance with various aspects, the query can yield address data associated with one or more PGW devices that can be relatively more proximate than IoT device 202A to the current location of user equipment device 104. IoT hub device 202A on determining address data representative of the one or more PGW devices that are relatively nearer to the current location of user equipment device 104, IoT hub device 202A can send the address data to user equipment device 104 and thereafter facilitate attachment and/or communication of user equipment device 104 with the one or more identified PGW devices and/or with one or more IoT hub devices (e.g., IoT hub device 202B) that are relatively more proximate to the one or more identified PGW devices. Once IoT hub device 202A has ascertained that user equipment device 104 has established communication with IoT hub device 202B and/or is in operative communication with the one or more identified PGW devices, IoT hub device 202A can facilitate detachment from and/or serving requests from user equipment device 104.

In further embodiments, when user equipment device 104 is relocated from a first wired and/or wireless communication network controlled and/or maintained by a first MNO entity carrier network to a second wired and/or wireless communication network controlled and/or maintained by a second MNO entity carrier network, on power up user equipment device 104 can transmit a device specific software development kit (SDK) query to a server device of a collection of server devices (not shown). The server device of the collection of server devices can be associated with the first MNO entity carrier network (e.g., "homed" MNO entity carrier network) and/or the second MNO entity carrier network (e.g., "foreign" MNO entity carrier network). Further, in some instances and in accordance with additional embodiments, the server device of the collection of server devices can be associated with one or more "intermediary" MNO entity carrier network that can be located at intermediary locations between the "homed" MNO entity carrier network and the "foreign" MNO entity carrier network. The server device of the collection of server devices, in accordance with one or more embodiments, can forward the device specific SDK query to a networked device associated with a MNO entity device. The networked MNO entity device can be any device in a group of networked devices and can be associated with the homed MNO entity network infrastructure, the foreign MNO entity network infrastructure, and/or one or more intermediary MNO entity network infrastructure. A responding MNO entity device can execute (or facilitate execution) of the device specific SDK query and return address data representing an IoT hub device (e.g., IoT hub device 202B) that the user device should attach to and/or establish operational communications with. As will be appreciated by those ordinarily skilled in the art, the address data representative of IoT hub device 202B returned as a consequence of transmitting the device specific SDK query will generally be addressing data associated with the IoT hub device (e.g., IoT hub device 202B) that is the most proximate to the current location of the user equipment device 104.

In various additional and/or alternative embodiments, when user equipment device 104 is relocated from a first wired and/or wireless communication network controlled and/or maintained by a first MNO entity carrier network to a second wired and/or wireless communication network controlled and/or maintained by a second MNO entity carrier network, on power up user equipment device 104 can attempt to establish communication with a first IoT hub device (e.g., IoT hub device 202A) associated with the first MNO entity carrier network. Because user equipment device 104 is not being powered up in an environment controlled by the first MNO entity carrier network, a PGW device (not shown) associated, for example, with a different (e.g., remote) MNO entity network can intercept the establishment request from user equipment device 104. The incepting PGW device, using the protocol option included within the general packet radio (GPRS) tunneling protocol (GTP), can send address data associated with a second IoT hub device (e.g., IoT hub device 202B) to user equipment device 104. The address data associated with the second IoT hub device (e.g., IoT hub device 202B) can be address data that user equipment device 104 should use to attach to the second IoT hub device (e.g., IoT hub device 202B).

In view of the example system(s) described above, example method(s) that can be implemented in accordance with the disclosed subject matter can be better appreciated with reference to the flowcharts in FIGS. 3-8. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

Figure 3:
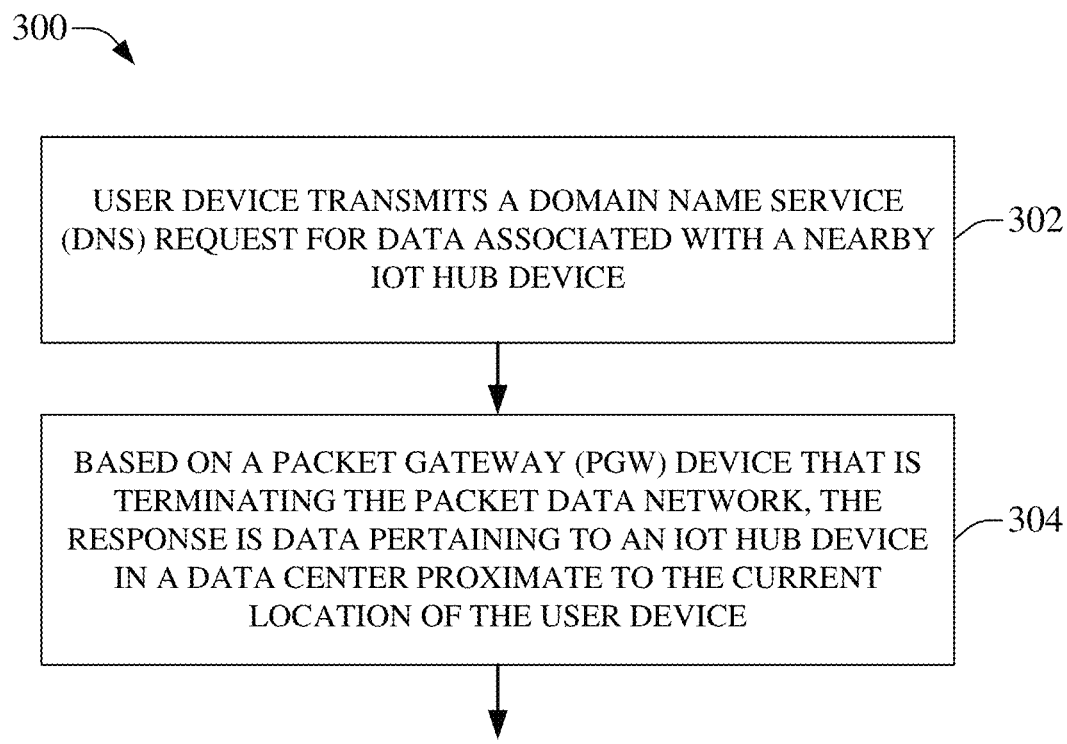
FIG. 3 provides depiction of a flow chart or method for dynamically selecting and routing traffic from Internet of things (IoT) devices and sensors to the nearest or most proximate IoT hub device, in accordance with aspects of the subject disclosure.

FIG. 3 illustrates a method 300 for dynamically selecting and routing traffic from Internet of things (IoT) devices and sensors to the nearest or most proximate IoT hub device, in accordance with aspects of the subject disclosure. Method 300 can commence at 302 wherein a user device or an IoT device (e.g., user equipment device 104), on power up for example, can transmit or broadcast a domain name service (DNS) request for address data associated with a nearby IoT hub device. It is to be understood in this context that the user device can have been previously provisioned (e.g., by provisioning server device 102) with address data associated with an IoT hub device associated with, for instance, a different mobile network operator entity; an IoT hub device located in a disparate continent, country, and/or economic trading bloc. At 304, a packet gateway (PGW) device, that can be a terminating PGW device that terminates a packet data network associated with a MNO entity carrier network, can respond to the DNS query initially sent by the user device with address data pertaining to an IoT hub device that is more proximate to the current location of the user device.

Figure 4:
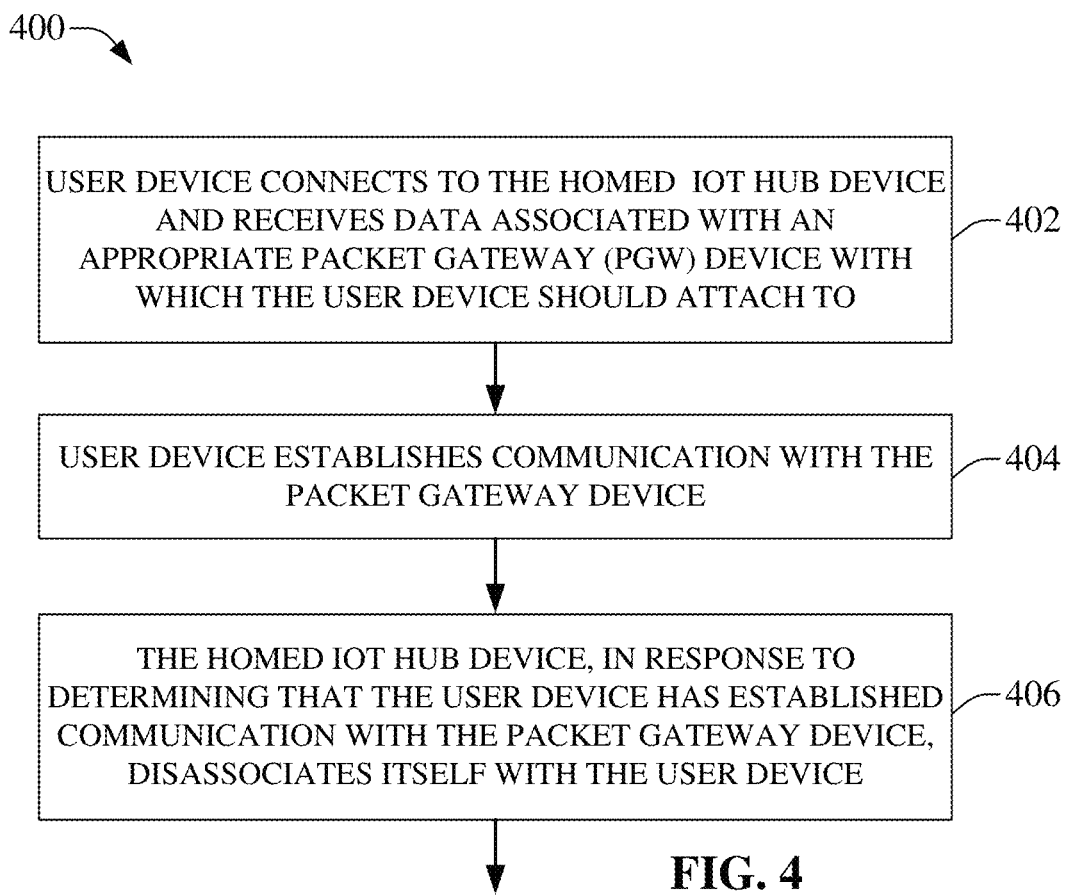
FIG. 4 provides additional depiction of a flow chart or method for dynamically selecting and routing traffic from Internet of things (IoT) devices and sensors to the nearest or most proximate IoT hub device, in accordance with aspects of the subject disclosure.

FIG. 4 illustrates a method 400 for dynamically selecting and routing traffic from Internet of things (IoT) devices and sensors to the nearest or most proximate IoT hub device, in accordance with aspects of the subject disclosure. Method 400 can start at act 402 wherein a user device, such as an IoT device, having been moved or located to a new geographic location and on power up in the new geographic location, can connect to the homed IoT hub device (e.g., the IoT hub device to which it was originally configured to establish operative communications with by provisioning server device 102). Also at 402 the homed IoT hub device can send back address data associated with a packet gateway (PGW) device to which the user device should attempt to contact. The PGW device, in this instance, will generally be located in a more proximate location with regard to the current location of the user device. At act 404, the user device, in response to receiving the address data associated with the PGW device, and based on the address data of the PGW device can commence operative and/or effective communication with the PGW device. The PGW device, once the user device has established communication with it, can provide an appropriate IoT device to which, and through which, the user device can receive service on the packet network to which the PGW device is associated. At act 406 the homed IoT hub device, in response to determining that the user device has, through the facilities and/or functionalities of the PGW device, established operative and/or effective communication with an new IoT hub, can disassociate itself from servicing the user device.

Figure 5:
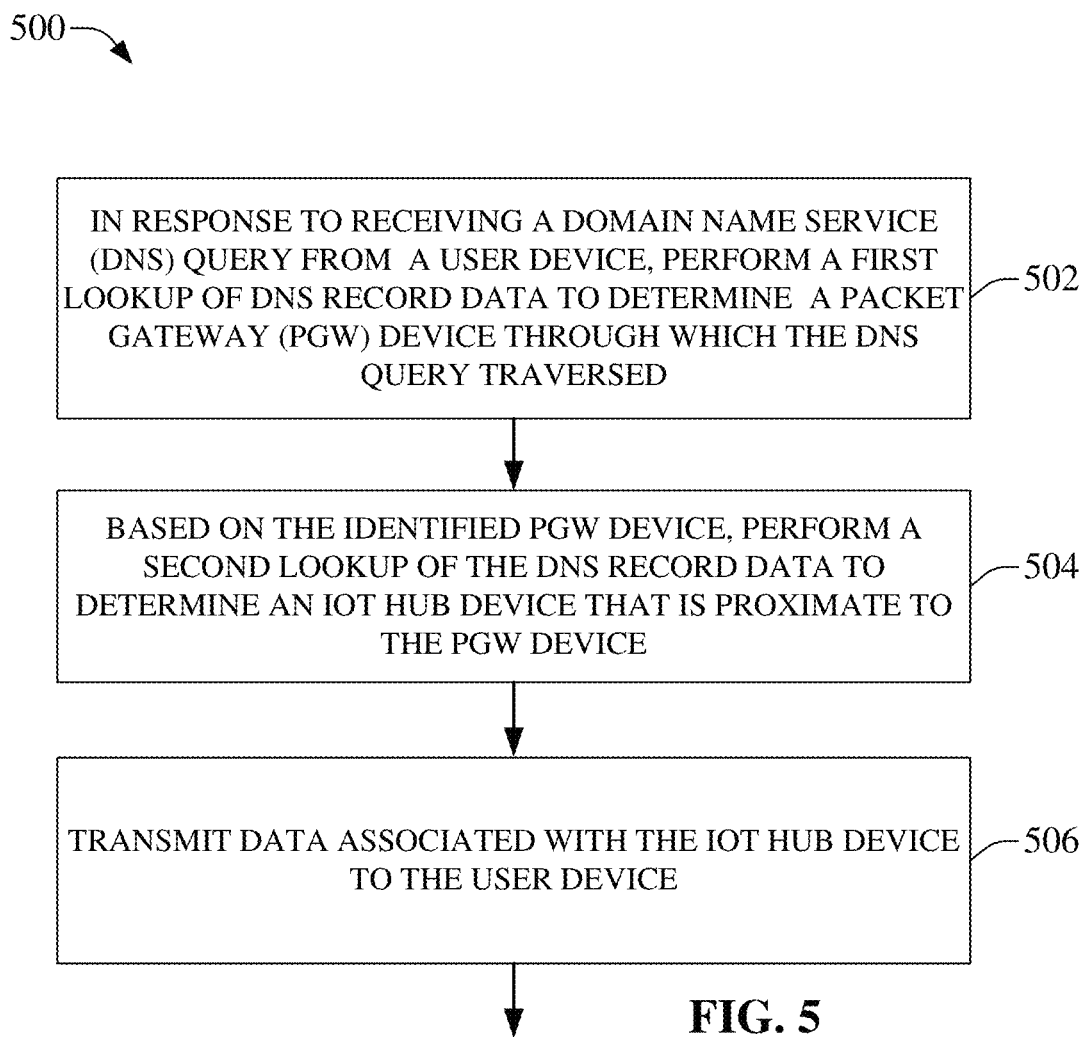
FIG. 5 provides further depiction of a flow chart or method for dynamically selecting and routing traffic from Internet of things (IoT) devices and sensors to the nearest or most proximate IoT hub device, in accordance with aspects of the subject disclosure.

FIG. 5 illustrates an additional method 500 for dynamically selecting and routing traffic from Internet of things (IoT) devices and sensors to the nearest or most proximate IoT hub device, in accordance with aspects of the subject disclosure. Method 500 can start at act 502 wherein in response to receiving a domain name service (DNS) query from a user device, such as a user equipment device, a DNS server device associated with either the user device's home mobile entity operator (MNO) carrier network or the user device's current MNO carrier network can perform a first lookup of DNS record data to determine a nearest packet gateway (PGW) device through which the DNS query from the user device traversed through. At act 504, based at least in part on the nearest PGW device identified by the first lookup of DNS record data, the DNS server device can perform a second lookup of the DNS record data to identify an IoT hub device to which the user device that initiated the earlier received DNS query should establish operative data interchange with. Typically, the IoT hub device identified by the second lookup of the DNS record data should be an IoT hub device that is the nearest to the nearest PGW device. At act 506 the DNS server device can forward address data representative of the address data of the IoT hub device that the user device should use to establish communication with the identified IoT hub device.

Figure 6:
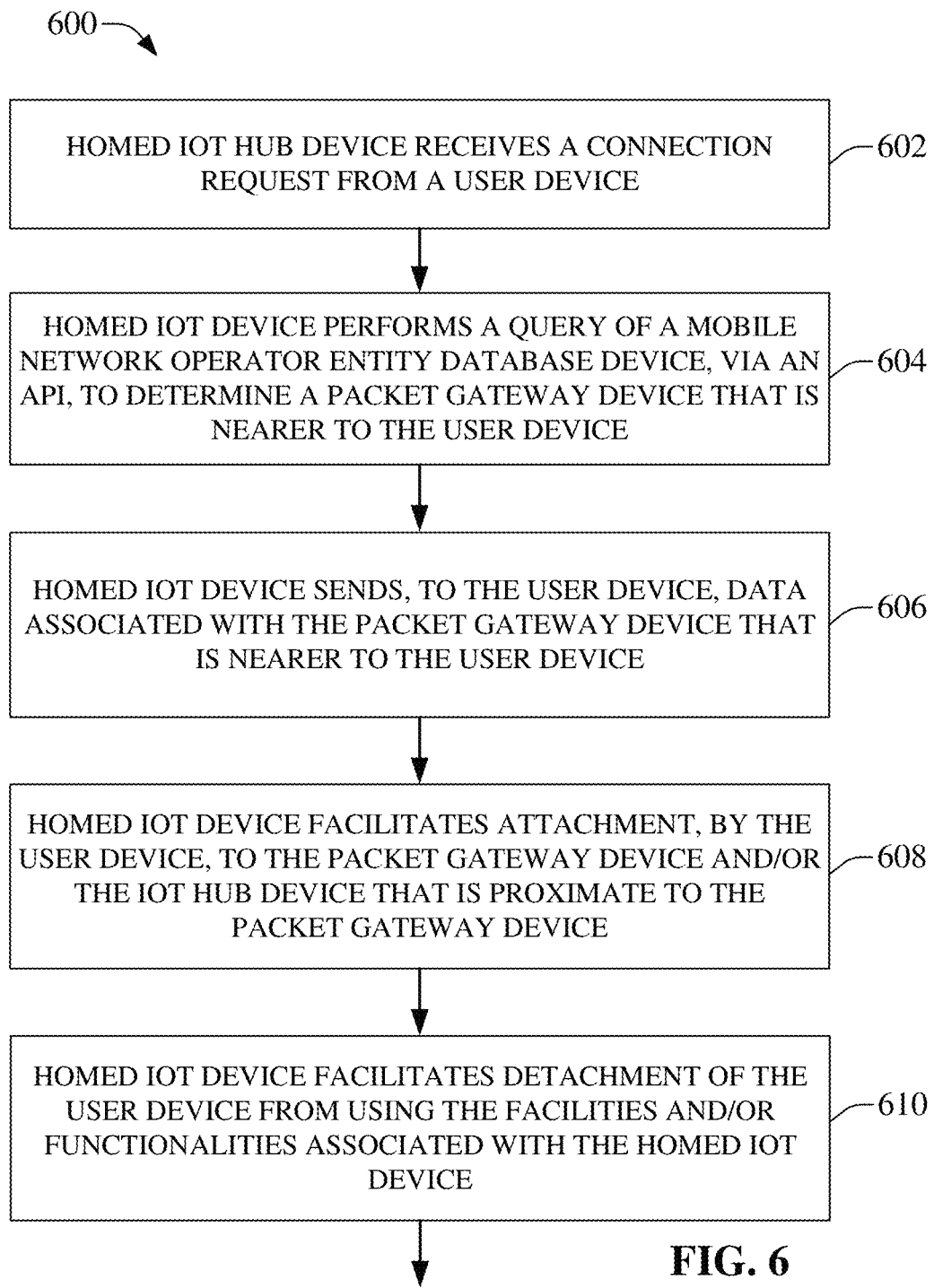
FIG. 6 provides illustration of a flow chart or method for dynamically selecting and routing traffic from Internet of things (IoT) devices and sensors to the nearest or most proximate IoT hub device, in accordance with aspects of the subject disclosure.

FIG. 6 provides depiction of an additional method 600 for dynamically selecting and routing traffic from Internet of things (IoT) devices and sensors to the nearest or most proximate IoT hub device, in accordance with aspects of the subject disclosure. Method 600 can start at act 602 where a homed IoT hub device receives a connection request from a user device that can have been moved or transferred from its home environment to another geographical location. At 604 in response to receiving the connection request from the user device, the homed IoT hub device, via an application programming interface (API), can effectuate or facilitate execution of a query of a database device of a grouping of database devices associated with a mobile network operator (MNO) entity carrier network to determine address data associated with a packet gateway (PGW) device that is nearer to the current location of the user device. At 606 the homed IoT device, on receiving the address data associated with a more proximate PGW device can send this address data to the user device. At 608 the homed IoT device can facilitate attachment, by the user device, to the PGW device and/or a IoT hub device that, based on the identification of the PGW device, can be more proximate to the current location of the user device. At act 610, the homed IoT hub device, having determined that the user device has successful accomplished attachment to either the PGW device and/or the IoT hub device, can facilitate detachment of the user device from using the functionalities and/or facilities provided by the homed IoT hub device.

Figure 7:
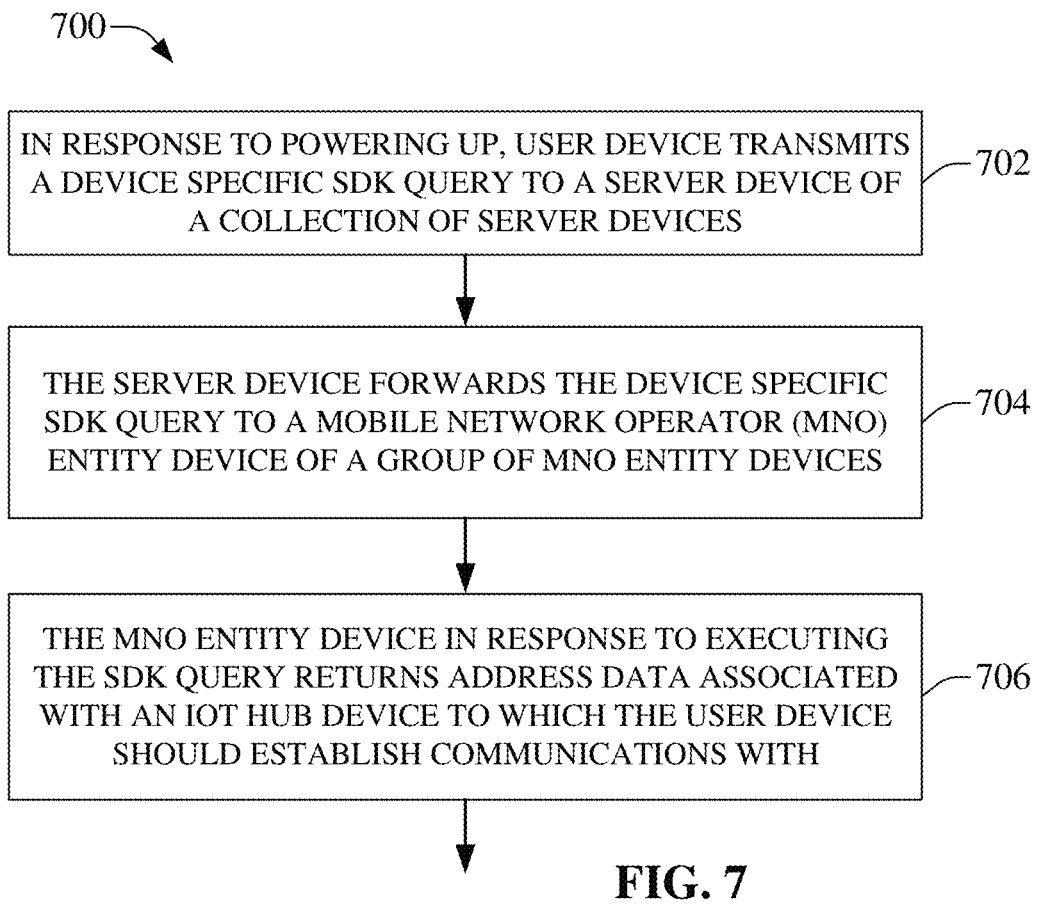
FIG. 7 provides further illustration of a flow chart or method for dynamically selecting and routing traffic from Internet of things (IoT) devices and sensors to the nearest or most proximate IoT hub device, in accordance with aspects of the subject disclosure.

FIG. 7 provides depiction of an additional method 700 for dynamically selecting and routing traffic from Internet of things (IoT) devices and sensors to the nearest or most proximate IoT hub device, in accordance with aspects of the subject disclosure. Method 700 can begin at act 702 wherein in response to power up, a user device can transmit a device specific software development kit (SDK) query to a server device of a collection of server devices. In this instance and in accordance with various embodiments, the server device of the collection of server devices can be associated with the "homed" MNO entity carrier network and/or the "foreign" MNO entity carrier network. Further, in some instances and in accordance with additional embodiments, the server device of the collection of server devices can be associated with one or more "intermediary" MNO entity carrier network that can be located between the "homed" MNO entity carrier network and the "foreign" MNO entity carrier network. At act 704 the server device of the collection of server devices can forward the device specific SDK query to a device associated with a MNO entity device. The MNO entity device can be a device of a group of devices and can be associated with the homed MNO entity network infrastructure, the foreign MNO entity network infrastructure, and/or one or more intermediary MNO entity network infrastructure. At act 706 a responding MNO entity device can execute (or facilitate execution) of the device specific SDK query and return address data representing an IoT hub device that the user device should attach to and/or establish operational communications with. As will be appreciated by those ordinarily skilled in the art, the address data representative of IoT hub device returned as a consequence of transmitting the device specific SDK query will generally be addressing data associated with an IoT hub device that is the most proximate to the current location of the user device.

Figure 8:
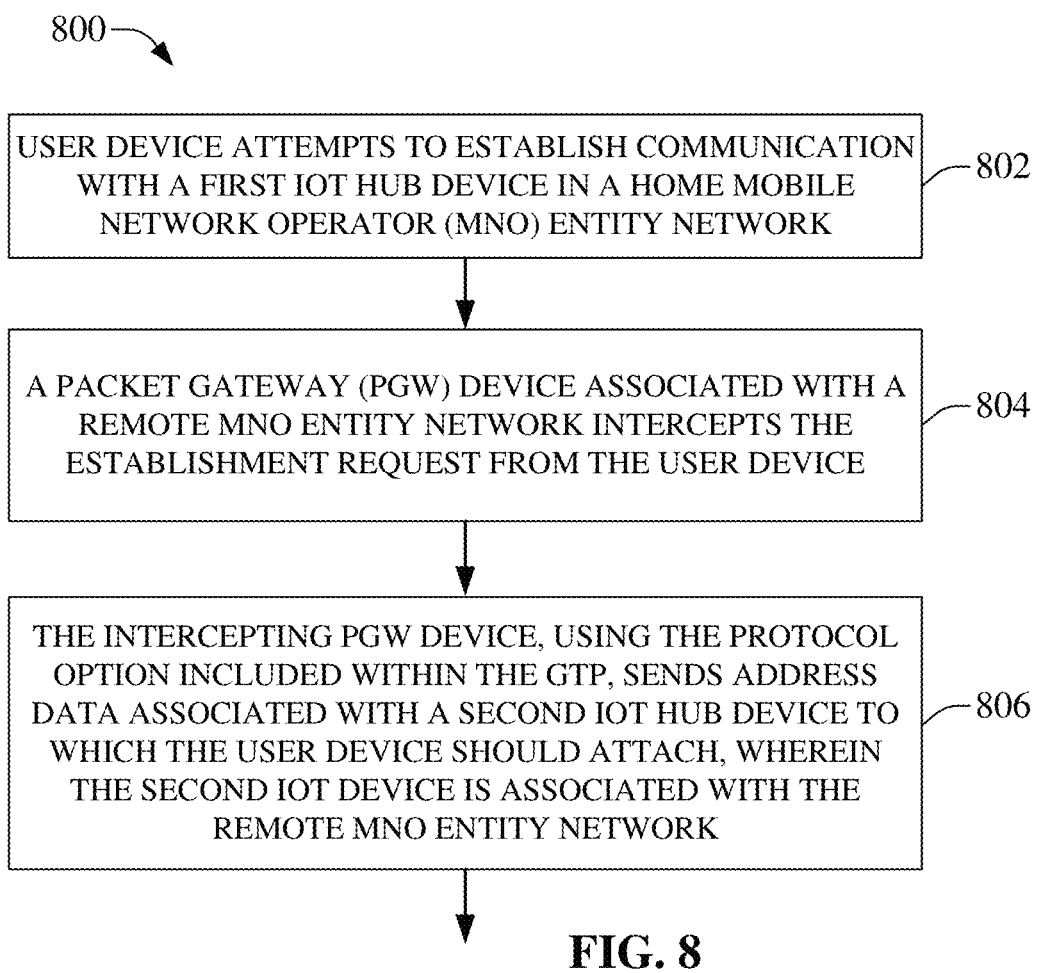
FIG. 8 provides another depiction of a flow chart or method for dynamically selecting and routing traffic from Internet of things (IoT) devices and sensors to the nearest or most proximate IoT hub device, in accordance with aspects of the subject disclosure.

FIG. 8 provides depiction of an additional method 800 for dynamically selecting and routing traffic from Internet of things (IoT) devices and sensors to the nearest or most proximate IoT hub device, in accordance with aspects of the subject disclosure. Method 800 can commence at act 802 wherein a user device, for example, on being powered up, can attempt to establish communication with a first IoT hub device associated with a home mobile network operator (MNO) entity network. At act 804 because the user device is not being powered up in an environment controlled by the home MNO entity, a packet gateway (PGW) device associated, for example, with a different (e.g., remote) MNO entity network can intercept the establishment request from the user device. At act 806 the incepting PGW device, using the protocol option included within the general packet radio (GPRS) tunneling protocol (GTP), can sends address data associated with a second IoT hub device to the user device. The address data associated with the second IoT hub device is the address data that the user device should use to attach to the second IoT hub device.

It should be realized and appreciated by those of ordinary skill, the foregoing non-limiting example use application(s) are merely illustrations of a use to which the disclosed and described solution can be applied and thus are provided solely for the purposes of exposition. The described and disclosed subject matter is therefore not limited to the foregoing example application(s), but can find applicability in other more generalized circumstances and use applications.

Figure 9:
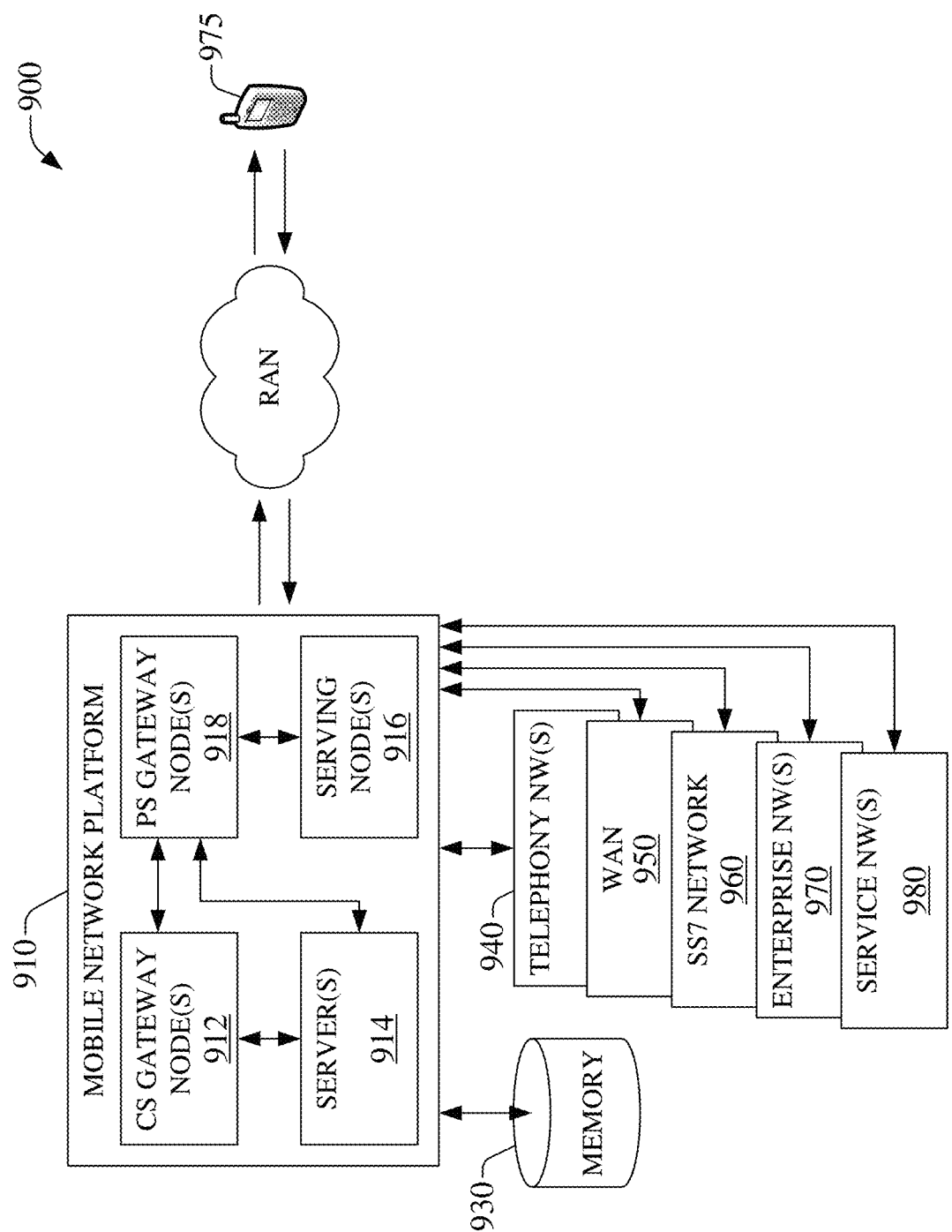
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
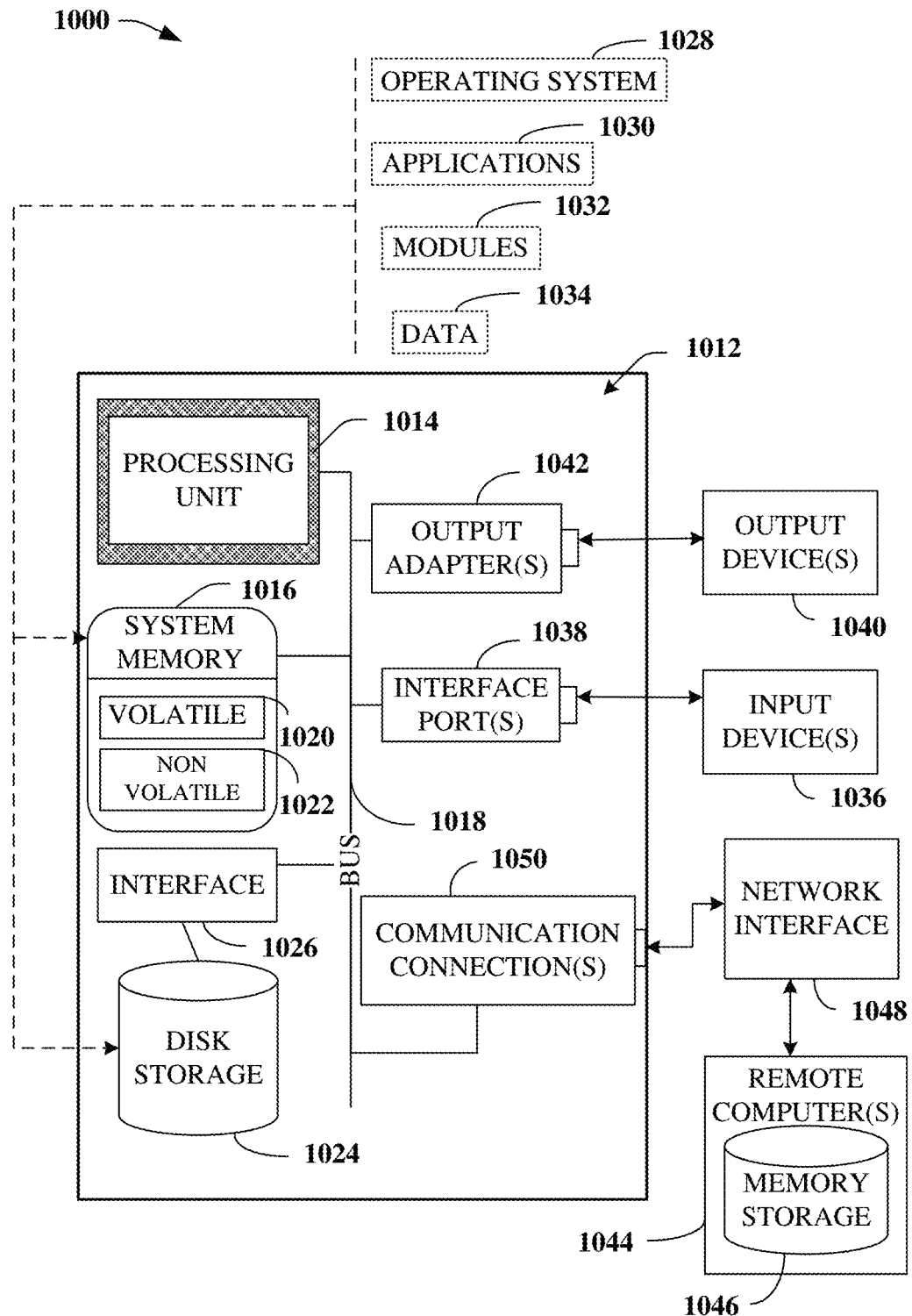
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 100, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
based on first address data representative of first hub equipment situated in a first geographic area and associated with a first network operator entity, retrieving second address data representative of second hub equipment situated in a second geographic area and associated with a second network entity, wherein the retrieving of the second address data is determined as a function of a geographic distance between a user equipment and the second hub equipment, and wherein the first hub equipment terminates a gateway segment associated with the first geographic area;
in response to transmitting the first address data or the second address data to the user equipment, receiving indicator data representative of an indication that the user equipment is communicating via the first address data or the second address data; and
based on the indicator data, deactivating a service applicable to facilitating future reconnection requests from the user equipment.

2. The system of claim 1, wherein the operations comprise receiving a connection request from the user equipment, and wherein the user equipment is operational in the second geographic area.

3. The system of claim 1, wherein the user equipment has been relocated from the first geographic area to the second geographic area.

4. The system of claim 1, wherein the first hub equipment comprises a domain name service server.

5. The system of claim 4, wherein the domain name service server is associated with the first network operator entity.

6. The system of claim 4, wherein the domain name service server is associated with the second network entity.

7. The system of claim 1, wherein the user equipment is preconfigured with an address associated with the first hub equipment, and wherein the user equipment uses the address to establish communication with the first hub equipment.

8. The system of claim 7, wherein the user equipment is an Internet of things device.

9. A method, comprising:
   in response to receiving a connection request from a user equipment, retrieving, by a device comprising a processor, first address data representative of first hub equipment situated in a first geographic area and associated with a first network operator entity, wherein the first address data is retrieved based on a geographic criterion being satisfied;
   based on the first address data representative of the first hub equipment, retrieving second address data representative of second hub equipment situated in a second geographic area and associated with a second network entity, wherein the retrieving of the second address data is determined as a function of a geographic distance between the user equipment and the second hub equipment;
   in response to communicating the first address data or the second address data to the user equipment, receiving, by the device, indicator data representative of an acknowledgment that the user equipment is using the first address data or the second address data to communicate with the device; and
   based on the indicator data, deactivating, by the device, a service that receives the connection request from the user equipment.

10. The method of claim 9, wherein the first hub equipment is a terminal node of a gateway segment servicing the first geographic area.

11. The method of claim 9, wherein the geographic criterion being satisfied is a function of a location of the user equipment being determined to be within a determined proximity distance value of the user equipment from the first hub equipment.

12. The method of claim 9, wherein the geographic criterion being satisfied is a function of a location of the user equipment being determined to be within a defined geographic area.

13. A non-transitory machine-readable medium, comprising executable instructions that, when executed by a processor, facilitate performance of operations, comprising:
   based on receiving a connection request comprising first address data associated with first hub equipment operated by a first operator entity and situated in a first geographic area, determining second address data associated with second hub equipment operated by a second operator entity and situated in a second geographic area, wherein the determining is based on a proximity determination representing a comparison between a first geographic distance between a mobile device and the first hub equipment and a second geographic distance between the mobile device and the second hub equipment, and wherein the first hub equipment terminates a gateway segment associated with the first geographic area; and
   in response to receiving acknowledgement data from the mobile device indicating that the mobile device has used the first address data or the second address data, deactivating a service that facilitates the receiving of the connection request.

14. The non-transitory machine-readable medium of claim 13, wherein the connection request is received from the mobile device.

15. The non-transitory machine-readable medium of claim 13, wherein the mobile device, prior to transmitting the connection request, is associated with the first hub equipment.

16. The non-transitory machine-readable medium of claim 13, wherein the operations comprise deactivating the service in response to determining that the second operator entity operates in a regulatory area that restricts user data generated by the mobile device, while the mobile device associated with the second hub equipment, from being communicated outside the regulatory area.

17. The non-transitory machine-readable medium of claim 13, wherein the mobile device broadcasts the connection request in response to receiving electrical power from a mains power supply.

18. The non-transitory machine-readable medium of claim 13, wherein the mobile device uses the first address data to initiate a communication session with the first hub equipment.

19. The non-transitory machine-readable medium of claim 13, wherein the mobile device, prior to receiving electrical power from a mains power supply, is preconfigured with the first address data.

20. The non-transitory machine-readable medium of claim 13, wherein the first address data is associated with domain name service equipment associated with the first operator entity.

* * * * *